Figure 1:
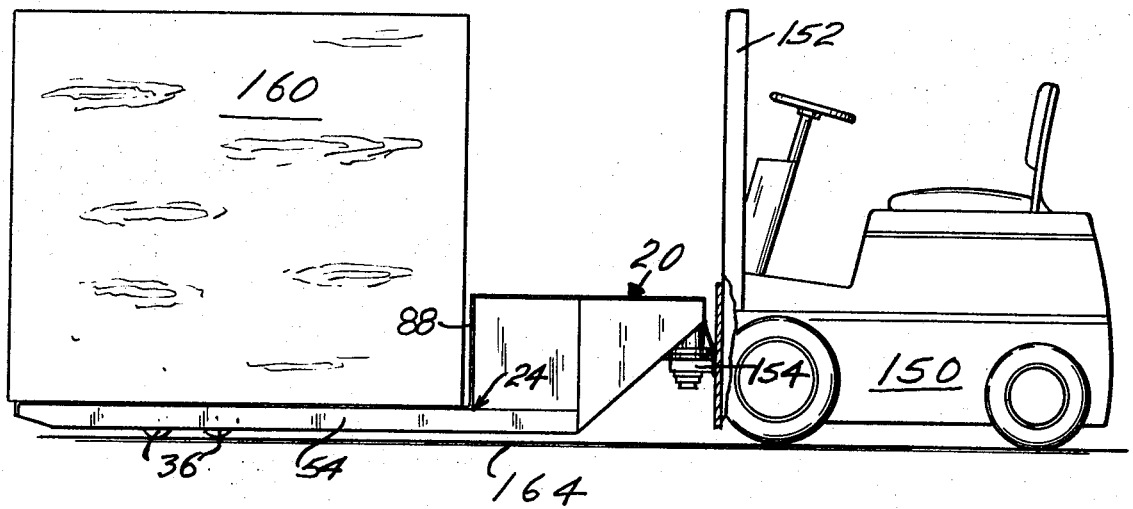

United States Patent
Tuura

[15] 3,669,292
[45] June 13, 1972

[54] MOVABLE PLATFORM

[72] Inventor: Eugene F. Tuura, 1741 4th Avenue South, Seattle, Wash. 98134

[22] Filed: Feb. 28, 1968

[21] Appl. No.: 709,137

[52] U.S. Cl.............................214/620, 214/38 CC, 214/512, 254/2 B, 254/93 HP
[51] Int. Cl........................................................B60p 1/02
[58] Field of Search.....................214/38.4, 38.46, 512, 515, 214/620; 254/93, 2.4

[56] References Cited

UNITED STATES PATENTS

| 3,185,238 | 5/1965 | Coates | 254/93 X |
| 3,213,993 | 10/1965 | Long | 214/38.40 |
| 3,247,991 | 4/1966 | Romine et al. | 214/620 X |
| 3,258,146 | 6/1966 | Hamilton | 214/620 |

Primary Examiner—Robert G. Sheridan
Attorney—Thomas W. Secrest

[57] ABSTRACT

This invention is for a movable platform capable of moving containers weighing up to 50,000 pounds. The movable platform must be able to go under a container on blocks, and then be elevated so as to lift the container off the blocks for moving to a new location. The movable platform comprises a set of wheels which contact a floor and also comprises the load deck. There is an extendable means between the frame for the wheels and the load deck so that the vertical position of the load deck with respect to the wheels can be varied. Normally, these large containers are placed on blocks having a height of 6 inches. Therefore, it is necessary that the movable platform be able to go under a container on a 6 inch block. With this in mind, I have invented this movable platform which from the floor to the top of the load deck encompasses a distance of approximately 5 ½inches. With this low vertical height, the movable platform can be moved underneath a container on the 6 inch blocks and then the movable platform elevated so as to lift the container off the 6 inch blocks for movement to a new location.

1 Claim, 11 Drawing Figures

INVENTOR.
Eugene F. Tuura
BY
TW Secrest

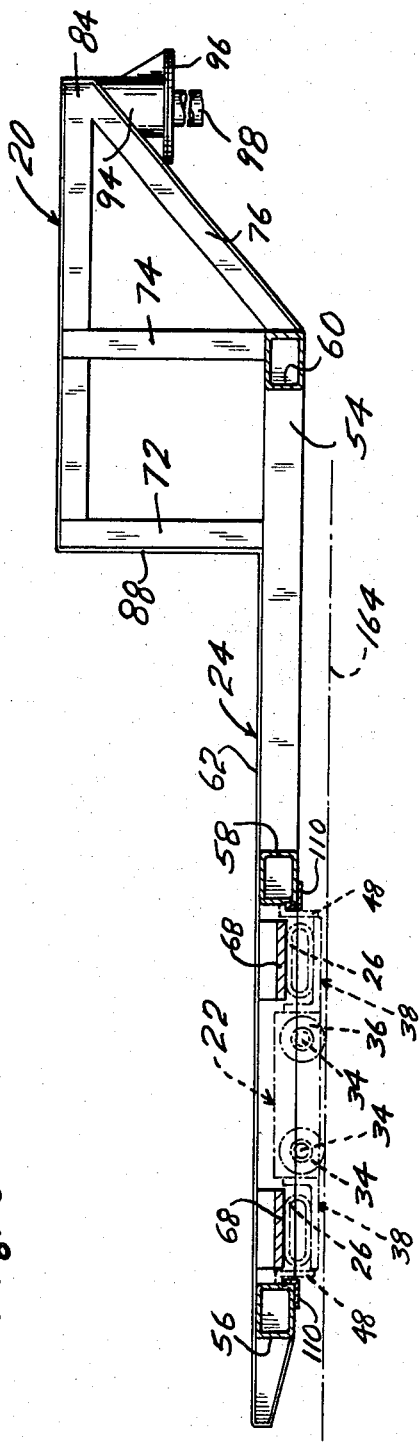
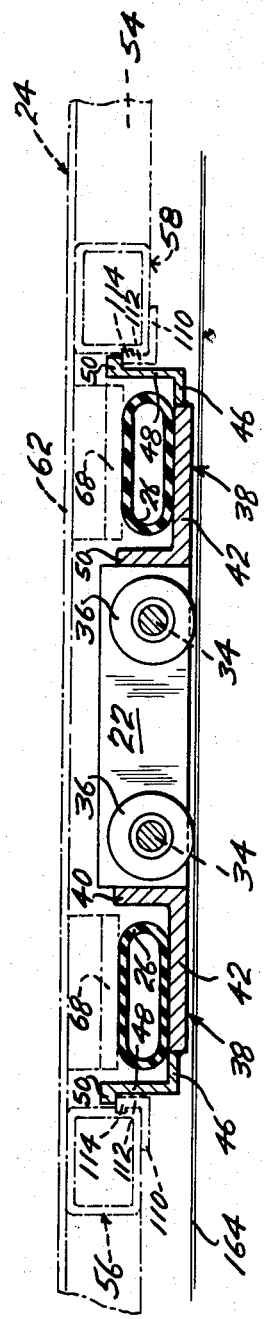
Fig. 9
Fig. 10

MOVABLE PLATFORM

In recent years the use of containers for transporting goods and material has increased. For example, at the present time there are in use 50,000 pound containers, or 25 ton containers. The moving of the 25 ton containers is a considerable undertaking. A forklift truck capable of moving this large container is a large truck. Such a truck is relatively difficult to maneuver in the wing of a ship and also is quite expensive to manufacture and buy. One of the other ways used for moving a large container is by means of an air cushion whereby a blast of air is forced against the floor and the container is moved on a cushion of air. In theory, this is a fine way to move a large container, but in practice there are some difficulties encountered. For example, if the ship is leaning or tilting, then the container tends to move downhill and may even strike the floor. If there is a large crack or break in the floor so that the air can go through the crack or break, then the support for the container is decreased and the container may land on the floor.

For a number of years I have worked around moving equipment and observed the use of forklift trucks and have reviewed the use of air cushions for moving containers and from my experience in this field I have invented a movable platform which can be moved underneath a large container. The movable platform has wheels for contacting the floor and also has means for elevating its load deck with respect to the wheels so as to elevate the container off its supporting blocks. Then, the elevated container on the load deck can be moved to a new location. Accordingly, a primary object of this invention is to provide a movable platform which makes it possible to readily stow containers into the wings of ships; another important object of this invention is to provide a movable platform which makes it possible to transport any heavy load with a minimum of load concentration on the wheels and the floor. Another important object is to provide a movable platform for moving a container with a lift truck of a rated capacity equal to 20 percent of the gross load of the container; an additional object is to provide a movable platform for which there is a positive control so as to be able to move the container downhill or uphill, or even over relatively rough floors; a still further object is to provide a movable platform which is safe to use and there is a minimum possibility of injuring a worker; another important object of this invention is to provide a movable platform having two moving parts; an additional object of this invention is to provide a movable platform whereby all the controls are situated near the operator; another object is to provide a movable platform which has a low center of gravity and whose load deck is positioned low to the surface or near the floor; another object is to provide a movable platform having a leveling feature so as to be able to level a container positioned on the platform; and, a still further object is to provide a relatively low cost movable platform and which platform requires a minimum of maintenance.

These and other important objects and advantages of the invention will be more particularly brought forth upon reference to the appended drawings of the invention, the detailed description of the invention, and the appended claims.

Figure 2:
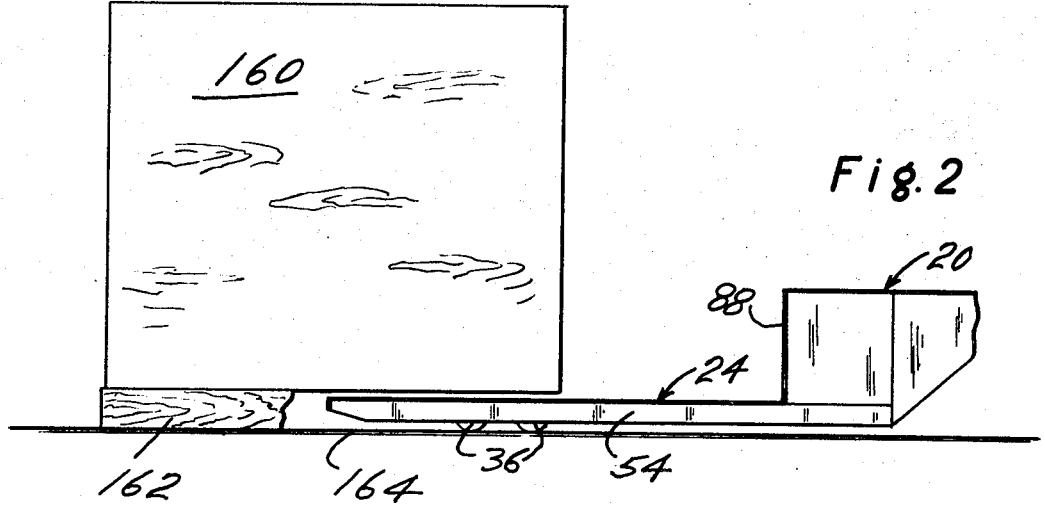
Figure 3:
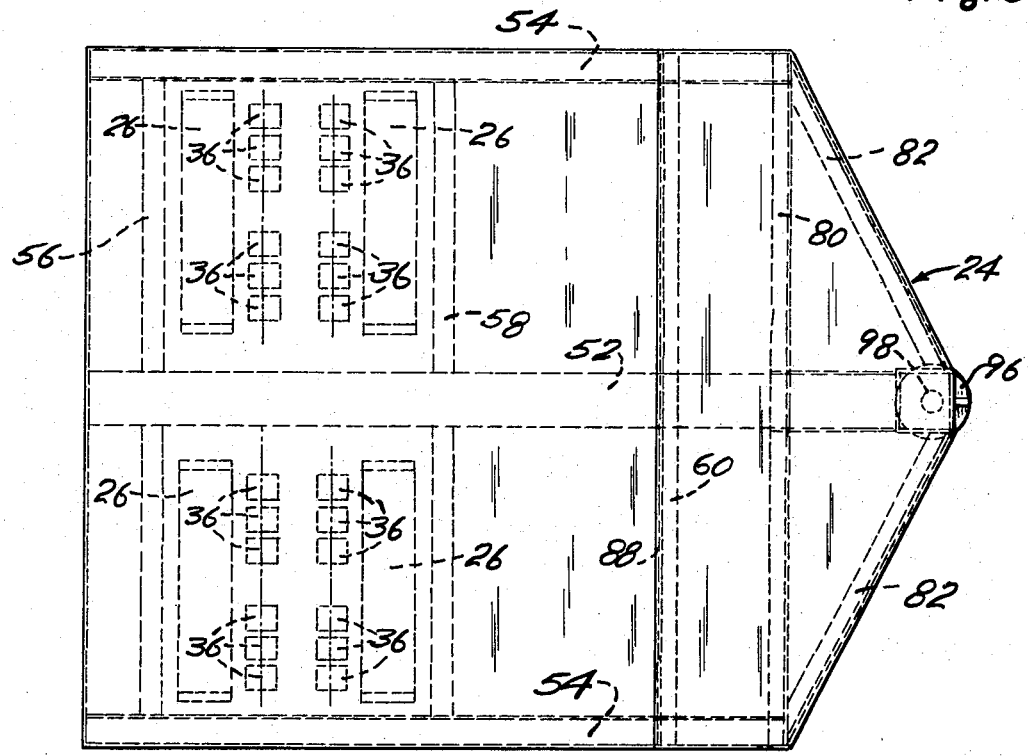
Figure 4:
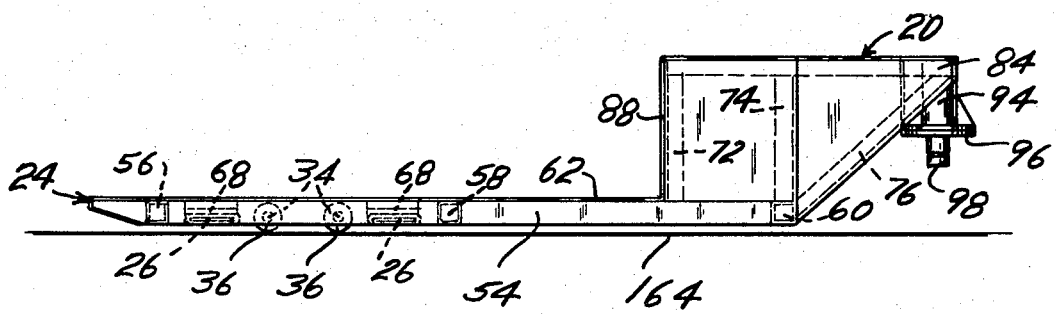
Figure 5:
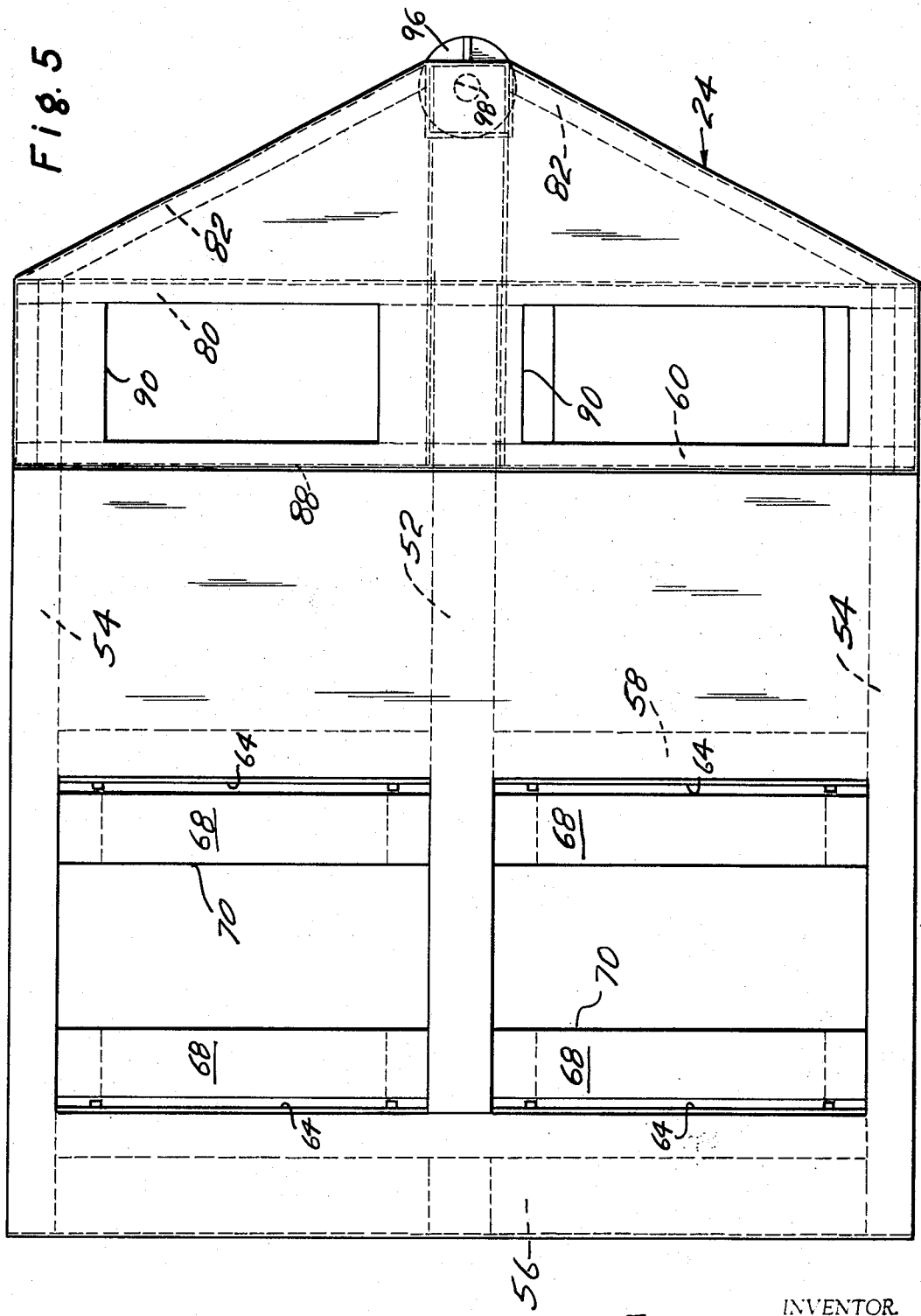
Figure 6:
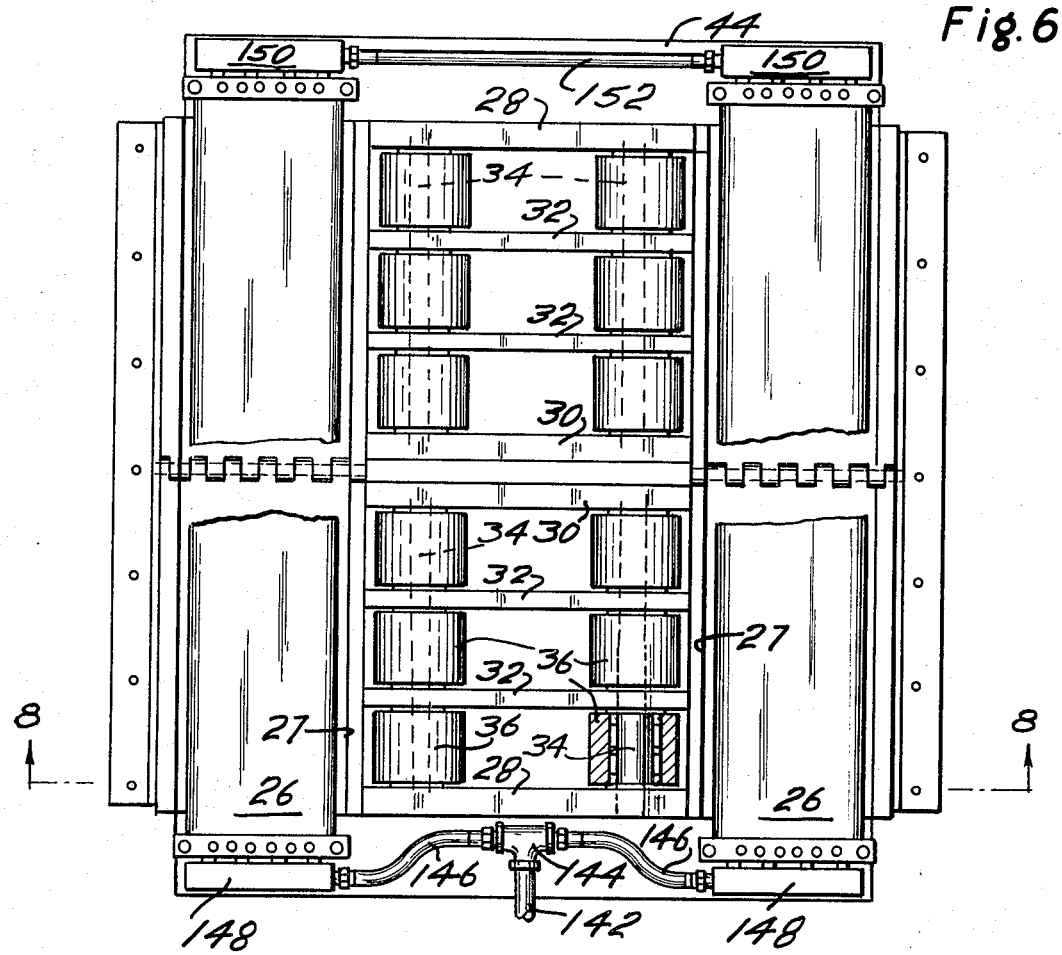
Figure 7:
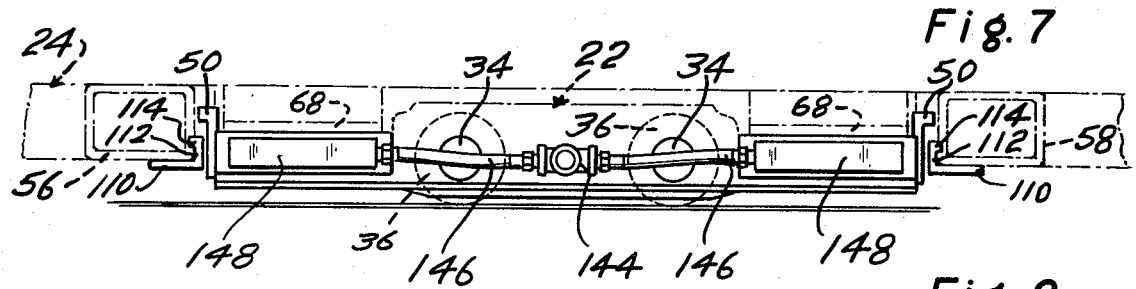
Figure 8:
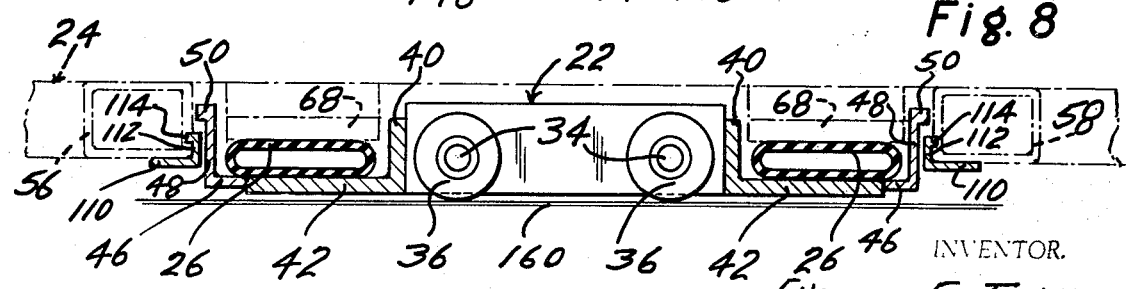
Figure 11:
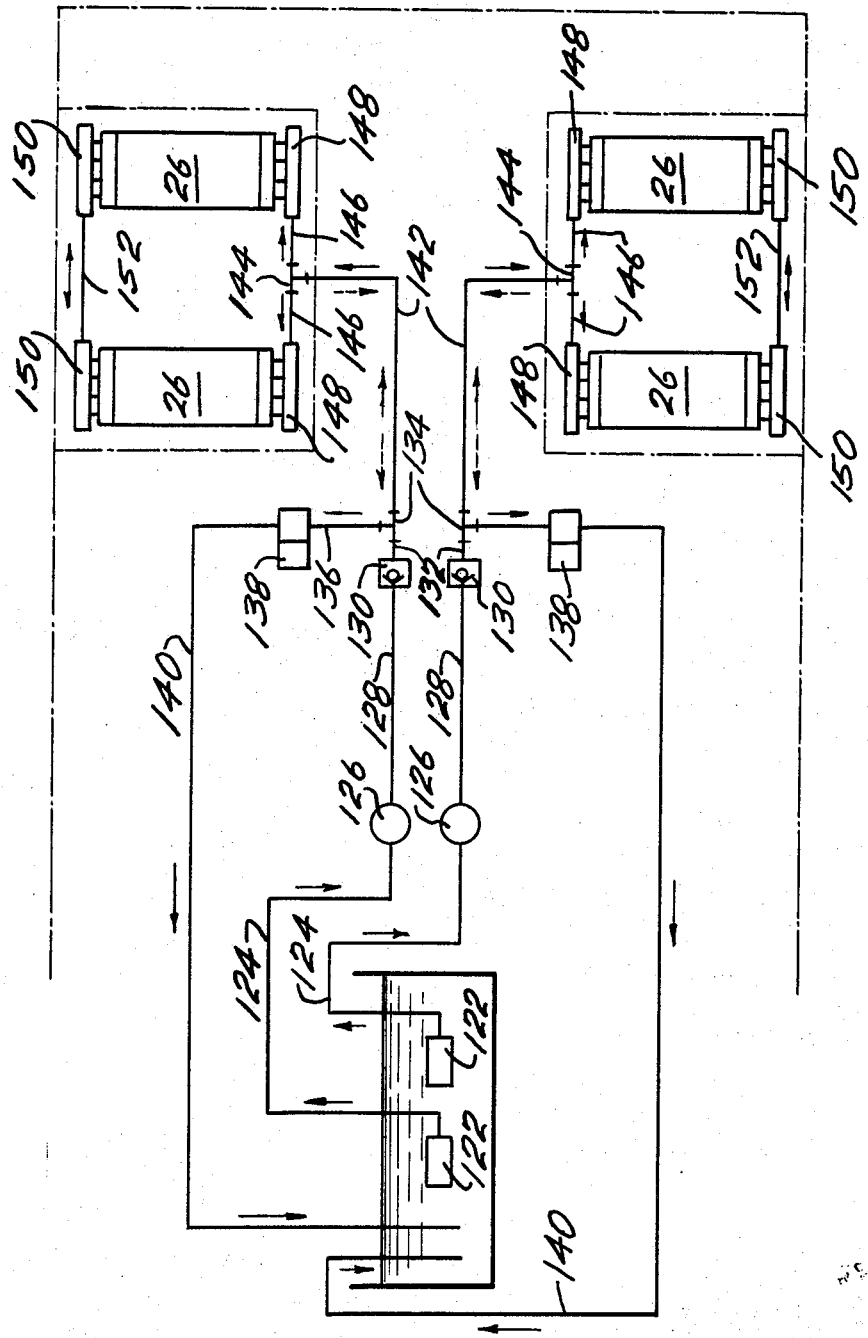

In the drawings:

In FIG. 1 there is illustrated a side elevational view of the movable platform, a container on the movable platform, and a forklift truck for moving the movable platform and the container;

In FIG. 2 there is illustrated a fragmentary portion of the platform, a container on a block with the block broken away so that the movable platform can be shown in partial position underneath the container;

In FIG. 3 there is a plan view looking down on the movable container and illustrating the load deck, and in phantom the wheels and the inflatable cushion for varying the vertical portion of the load deck with respect to the wheels;

In FIG. 4 there is a side elevational view of the movable platform comprising the load deck, the wheels, and, in phantom, the inflatable cushion for varying the vertical position of the load deck with respect to the wheels;

In FIG. 5, on a larger scale, there is a plan view of the movable platform and illustrates the wheel well, the position of the inflatable cushion, and the housing for housing the equipment for bearing the fluid pressure in the inflatable cushion;

In FIG. 6, on an enlarged scale, there is a fragmentary illustration of the frame for the wheels, the wheels as carried by the frame, and the inflatable cushion as carried by the frame;

In FIG. 7 there is a fragmentary side elevational view showing the frame for the wheels, the wheels in phantom, and the positioning of the inflatable cushion on the frame;

FIG. 8, taken on line 8—8 of FIG. 6, is a vertical cross-sectional view showing the frame for the wheels, the wheels, and the inflatable air cushion for varying the position of the load deck with respect to the wheels;

In FIG. 9, on a reduced scale, there is a fragmentary illustration of the movable platform and which illustration shows some of the details of construction of the frame for the movable platform such as the stud for the fifth wheel, the frame for the wheels and the wheels, the inflatable air cushions and the boat deck;

In FIG. 10, on an enlarged scale, there is a fragmentary illustration showing the frame for the wheels and the wheels, the inflatable cushions, and the load deck, in phantom, and with the limit means for limiting the vertical travel of the load deck with respect to the frame; and In FIG. 11 there is schematically illustrated the fluid pressure system for forcing fluid to the fluid inflatable cushion and also for allowing fluid to escape from the fluid inflatable cushion.

In the drawing it is seen that the invention comprises a movable platform 20. The platform 20 comprises a frame 22, load deck 24, and fluid inflatable cushions 26.

The frame 22 is fabricated from two spaced-apart side members 27 and two spaced-apart end members 28. The members 27 and 28 may be welded to form, see FIG. 6, what appears to be in the plan view, a rectangular outline. Further, there is a main central brace 30 running between the center parts of the sides 27, and additional braces 32 running between the sides 27. The ends 28, the main brace 30 and the minor braces 32 act as supports and bearings for the shaft 34. In FIG. 6 it is seen that there are two sets of spaced-apart shafts 34. On the two sets of spaced-apart shafts 34 there are wheels 36. More particularly, in FIG. 6 it is seen that there are twelve wheels 36 in the frame 22. For clarification purposes, there are two frames 22 for the movable platform 20. Therefore, there are 24 wheels 36 for the movable platform 20.

Attached to each side 27 there is a support 38 having a minor leg 40 and a major leg 42. The support 38 may be welded to the side 27. The major leg 42 acts as a support for the fluid inflatable cushion 26.

In FIG. 6 and in FIG. 7 it is seen that on the lower part of the ends 28 there is welded a plate 44.

On the edge of the major leg 42 there is welded, see FIG. 8, a member of a generally V-configuration having a lower leg 47, an upright base 48, and an upper leg 50.

In FIGS. 3, 5, and 9, there is illustrated the outline of the load deck 24. It is seen that the load deck 24 comprises a central longitudinal member 52 and two side longitudinal members 54. Also, there is an end lateral member 56 which runs between the two longitudinal members 54, two central lateral members 58 which run between the central longitudinal member 52 and the side longitudinal members 54 and another end lateral member 60 which runs between the longitudinal members 54.

On the members 52, 54, 56, and 58 there is positioned a heavy deck 62. The heavy deck 62 may be welded on top of these members. In the heavy deck 62 there are two spaced apart openings 64. Further, near each side of the opening and running between the members 52 and 54 are two spaced apart floor plates 68. In summing, there are two openings 64 and four plates 68.

In FIG. 5 it is seen that the two plates 68 in the opening 64 define an openings 70 for receiving the frame 22.

The plates 68 are recessed with respect to the heavy deck 62 and, as seen in FIGS. 7, 8, 9, and 10, the plates 68 are positioned above the major leg 42 of the support 38. The plates 68 are welded to the members 52 and 54 and act as a brace for the load deck 24. However, the major function of these plates 68 is to act as an upper bearing member against which the fluid inflatable cushion 26 can bear and push.

From FIGS. 9 and 10, it is seen that the load deck 24 also has a super structure. The super structure comprises inner upright members 72, central upright member 74, a sloping member 76 running from the member 60 upwardly, lateral members 78 and 80 and diagonal members 82 running from the upright members 74 to connect with an apex 84. The apex 84 connects with the upwardly directed member 76 (which connects with the lateral member 60), and the two diagonal members 84. In essence, the members 72, 74, 78, 80, and 82 define a housing. On the upper surface of this housing there is a skin 86 and on the front part of the housing and connecting with the upright member 72 there is a skin 88. In the skin 86 there are two rectangular openings 90, see FIG. 5.

In the openings 90 and inside of the super structure may be placed the fluid compression equipment for operating the fluid inflatable cushions 26. This equipment may include a fluid reservoir, pumps for the fluid, piping, valves, and the like. In addition, there may be placed in this housing means for driving the pump, such as a gasoline motor or an electric motor, and batteries for driving the electric motor. The equipment for the operation of the fluid system is explained in more detail in the latter part of the specification. In FIG. 9 it is seen that on top of the member 54 and also the member 60 that there is a skin 92 which provides a bearing surface inside the housing for the equipment of the fluid system.

In FIGS. 5 and 9 and near the apex 84 it is seen that there is a depending housing 94. The depending housing on its lower end has a circular plate 96. Depending from the circular plate 96 is a stud 98 for connecting with a fifth wheel.

In FIGS. 8 and 10 it is seen that on the lower surface of the member 56 and also on the lower surface of the member 58 there is, in a lateral cross-sectional configuration, a generally L-shaped member having a major leg 110 and a minor leg 112. On the upper edge of the minor leg 112 there is an inwardly directed ledge 114. It is seen that this generally L-shaped member is welded to the lateral member 56 or to the lateral member 58 and directed toward the upright base 48 which is attached to the support 38. The ledge 114 and the upper leg 50 coact to limit the upward travel of the load deck 24 upon the inflation of the inflatable cushion 26. In FIG. 8 there is illustrated the load deck in a lowered position with the ledge 114 out of contact with the upper leg 50. In FIG. 10 there is illustrated the load deck in a raised position with the ledge 114 in contact with the upper leg 50. As is seen in FIG. 10, the upper leg 50 and the ledge 114 limit the upward travel of the load deck 24 and can be considered to be a limit means in this regard.

In FIG. 11 there is schematically illustrated the fluid system for inflating the inflatable cushions 26 and for allowing these fluid cushions to deflate. This fluid system comprises a reservoir 120. In FIG. 11 it is seen that there are four inflatable cushions 26, two for each side of the movable platform 20 or two for each set of wheels. For each set of two inflatable cushions 26 there is a separate system. Therefore, the same reference numerals will be used for identical parts for the two systems. In the reservoir 120 there is positioned an intake and filter 122. The intake and filter 122 connects with the line 124 which connects with a pump and motor unit 126. A line 128 connects with the pump and motor unit 126 and also connects with a one-way valve 130. The one-way valve allows fluid to flow from the pump and motor unit 126 through the line 128 but does not allow a reverse flow of fluid. Then, the one-way valve connects with the line 132 which in turn connects with a T 134. The T 134 connects with a line 136 which connects with a on-off valve 138. The on-off valve connects with line 140 which leads to the reservoir 120. The T 134 connects with the line 142 which in turn connects with the T 144. The T 144 connects with two lines 146. Each line 146 connects with a header 148. The header 148 connects with the inflatable cushion 26 on one end. On the other end of the inflatable cushion 26 there is a second header 150. A line 152 connects the two headers 150 on the ends of the two inflatable cushions 26 in a set.

In operation the valve 138 is closed so that fluid cannot flow through the line 136, through the valve 138, and to the line 140. This precludes the flow of fluid from the inflatable cushions 26 and to the reservoir 120. Then, the pump 126 pumps fluid from the reservoir 120 and to the inflatable cushion 26. Fluid pressure is increased in the inflatable cushions 26 in this manner or the fluid pressure may be maintained in this manner. With the fluid pressure increased it is seen, see FIGS. 8 and 10, that the inflatable cushion expands and bears against the plate 68. As is recalled, the plate 68 is positioned over the inflatable cushion 26 and is connected to the frame of the load deck 24. With the expansion of the inflatable cushion 26, the load deck 24 rises vertically or the position of the load deck 24 with respect to the frame 22 is varied vertically. In this manner the load deck is raised and bears against the lower part of a container. The container can also be elevated with the elevation of the load deck. Then, the movable platform 20 can be moved and to a new location, the valve 138 adjusted so that the fluid can flow from the inflatable cushions 26 through the lines 146, the T 144, the line 142, and the T 134, the line 136, the valve 138 and the line 140 back to the reservoir 120. In this manner the load deck 24 is lowered vertically with respect to the frame 22.

In FIG. 1 it is seen that there is a forklift truck 150 which has a forklift apparatus 152 on the front end. Further, on the vertically adjustable forks there is a fifth wheel attachment 154.

In FIG. 1 it is seen that there is a forklift truck 150 which has a forklift apparatus 152 on the front end. Further, on the vertically adjustable forks, there is a fifth wheel attachment 154.

The forklift truck can be maneuvered so that the fifth wheel is underneath and adjacent to the stud 98 of the movable platform 20. Then, the fifth wheel on the lifting device 152 can be elevated so that the stud 98 and the fifth wheel 154 are in coacting relationship to tie together the movable platform 20 and the forklift truck 150.

In FIG. 5 it is seen that there are two wheel wells 70 for receiving frames 22. A frame 22 goes in each wheel well. In FIG. 11, it is seen that for each wheel well there is an inflatable cushion 26 which is positioned underneath the plate 68. For each wheel 70, there are 12 wheels 36. Or, for the entire movable platform there are 24 wheels 36. Further, from FIGS. 1, 2, 3, 4 and 9, it is seen that the wheels are near the free or open end of the movable platform 20, i.e., away from that part of the platform having a housing as defined by members 72, 74, 76 and the like. When this is considered in conjunction with the lift truck 150, then it can be seen that, with the wheels 36 near the open end of the movable platform 20, the lift truck 150 can adjust the tilt of the movable platform 20 around the wheels 36. More particularly, if the movable platform 20 lifts a load and the load is not evenly balanced on the movable platform 20, then the rear end or that end of the platform 20 near the stud 98 may be tilted downwardly with respect to the open end of the platform 20. The lifting truck 150 can lift the stud 98 and, also, that end of the platform 20 near the stud 98 so that the platform 20 is substantially level. Further, there is a built-in leveling device because of the four inflatable cushions 26. In FIG. 11 and, also, in FIG. 5, it can be seen that these inflatable cushions are spaced apart with respect to each other in a set and, also, that the sets are spaced apart and that the inflatable cushions run laterally approximately a little less than half the width of the movable platform 20. If a container having an unevenly distributed load is lifted by the movable platform 20, then the inflatable cushions 26 can be adjusted so as to more evenly distribute this load and to level the load deck 24 of the platform 20. More particularly, in a set of inflatable cushions 26, the leveling process will be automatic as the fluid pressure will be equally placed between the two inflatable cushions in the set 26. In regard to the inflatable cushions of the two sets, it is possible by the operator through the controls on the motor and pump combination 126 and, also, by the valve 138, to increase the fluid pressure in one set of the inflatable cushions as contrasted with the fluid pressure in the other set of inflatable cushions; or, conversely, to lessen the fluid pressure in one set of inflatable cushions as contrasted with the fluid pressure in the other set of inflatable cushions.

With this movable platform 20, I have used the 6,000 pound capacity forklift truck, rated at 24 inch load center, to move a 45,200 pound container with a load. Normally, I consider that the lift truck 150 will carry approximately 20 percent of the load of the container and the platform 20 will carry 80 percent. Therefore, with a 45,200 pound load, the lift truck 150 should carry approximately 9,000 pounds and the movable platform 20 approximately 36,000 pounds. However, the capacity of lift truck 150 was 6,000 pounds which indicates that the movable platform 20 will carry the load of approximately 39,000 pounds.

In building and testing one of these movable platforms, I constructed one having a width of 116 inches, a load platform length of 8 feet.

In FIGS. 1 and 2 there is illustrated the units of the movable platform. In FIG. 2 there is illustrated a container 160 on blocks 162. The blocks 162 are 6 inches in thickness. The container 160 is placed on these blocks. The distance, when the cushions 26 are deflated, between the bottom of the wheels 36 on the floor 164 and the top of the load deck 24 is 5½ inches. It is seen that it is possible to maneuver the movable platform 20 so that it is underneath the container 160 and has approximately one-half inch clearance. Then, the inflatable cushions 26 can be inflated and the load deck 24 elevated approximately 2 to 2½ inches. With the load deck elevated 2 to 2½ inches, the top of the load deck and the bottom of the container are approximately 7½ to 8 inches off the floor 164. It is possible to maneuver the movable platform 20 and the container 160 to a new location and blocks positioned underneath the container 160 or the container 160 positioned on blocks and then the cushions 26 allowed to deflate so that the distance between the floor 164 and the top of the load deck 24 is 5½ inches. With 6 inch blocks 162, the container 160 now rests on 6-inch blocks, and the movable platform 20 can be maneuvered so that it is out from underneath and away from the movable container 160.

Many containers 160, today, are approaching a 50,000 pound size or 25 ton size. These containers are loaded onto board ship and are stowed in the wings of the ship. With my movable platform, it is relatively easy, and also relatively quick to maneuver these containers into the wings of the ship. Further, the movable platform 20 can be used for maneuvering the containers at the dock or the warehouse. Further, the movable platform 20 is also capable of moving containers less than a 50,000-pound capacity; but, at the present time, the containers are approaching this capacity and it is necessary to have some means to readily and quickly move a container of this size.

In regard to the power unit for the pump 126, it is possible to use a gasoline engine or a liquefied petroleum gasoline engine or a liquefied petroleum gas engine in conjunction with a pump or else it is possible to use an electric motor and a pump combination. With the housing near the stud 98 of the movable platform 20, it is possible to enclose all of the fluid system including the reservoir, the pump and motor 126 and the energy unit for driving the pump and motor 126. For example, if a gasoline motor is used, it is possible to house a gasoline motor and the fuel tank for the gasoline motor. If liquefied petroleum gas engine is used, then it is possible to house the engine and the gas pressure tank for the liquefied petroleum gas. In addition, if an electric motor is used, it is possible to house the electric motor and the battery for running the electric motor in this housing near the stud 98 of the movable platform 20.

Having presented my invention, it is seen that I have provided a relatively inexpensive movable platform which is capable of readily and quickly moving a large, heavy container from one position to another position; a movable platform which can occupy a relativly small volume on board ship or in a warehouse; a movable platform in which the deck 24 and the container can be leveled to a degree even though the surface on which the movable platform is tilted at an angle; a movable platform requiring a minimum of maintenance; and, a movable platform having a low load distribution on wheels and which load distribution, in the above example where 45,200-pound container was moved, had a loading factor of 49 pounds per square inch, which was less than the loading factor on the wheels and tires of the lift truck 150.

What I claim is:

1. A movable platform and a moving means comprising:
   a. a mobile base;
   b. a load deck;
   c. said mobile base supporing said load deck;
   d. a first extendable means for vertically varying the position of the load deck with respect to the mobile base;
   e. a connecting means between the movable platform and the moving means;
   f. said moving means being a truck;
   g. said truck having a lifting means;
   h. said truck having a fifth wheel;
   i. said lifting means being capable of varying the vertical position of the fifth wheel;
   j. said connecting means comprising a stud on the movable platform;
   k. said stud and said fifth wheel coacting to connect said truck and said movable platform; and,
   l. said lifting means and said fifth wheel in conjunction with the stud being capable of rotating the load deck with respect to the moving means mobile base.

* * * * *